June 27, 1933.  G. C. MILLER  1,916,124
FURNACE AND OIL CRACKING PLANT UNIT
Filed March 23, 1929   3 Sheets-Sheet 1

INVENTOR.

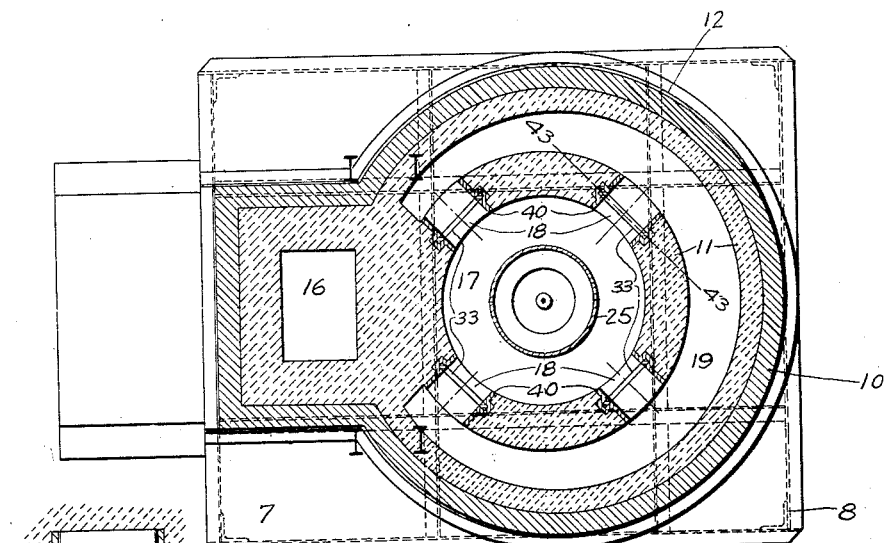
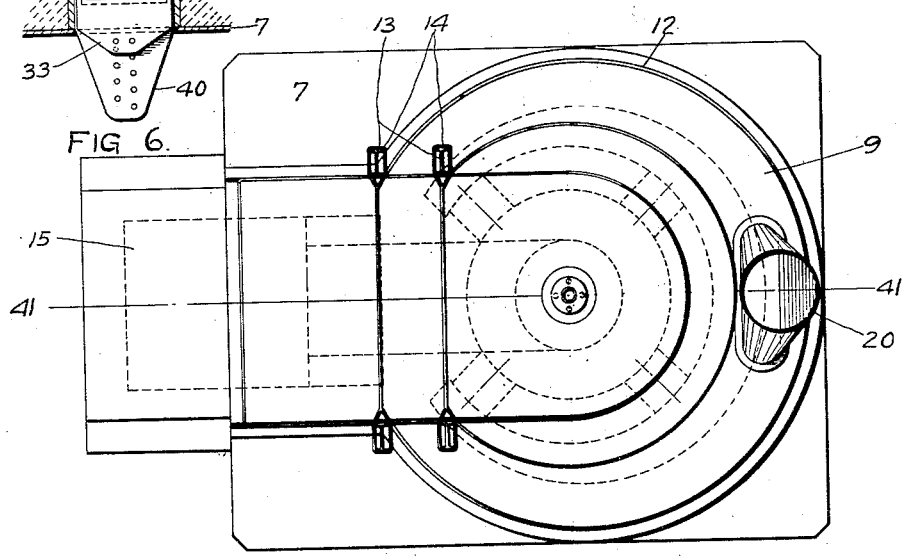

Patented June 27, 1933

1,916,124

UNITED STATES PATENT OFFICE

GROVER C. MILLER, OF LOS ANGELES, CALIFORNIA, ASSIGNOR OF ONE-HALF TO WILLIAM B. THOMAS, OF LOS ANGELES, CALIFORNIA

FURNACE AND OIL CRACKING PLANT UNIT

Application filed March 23, 1929. Serial No. 349,439.

My invention relates to a heating and cracking unit of a cracking plant for extracting gasoline and gases from petroleum and other oils, and it has particular relation to a plant and process for the separating of the various elements comprising crude petroleum oil, and more particularly to the separating of the gas and gasoline content therefrom; it has particular relation to a plant and process comprising a furnace and cracking unit specially designed for the recovery, through a cracking process, of the greatest percentage of the commercial content of crude petroleum oil at the most economic cost. It consists of a down draft furnace, eccentric flue and damper controls, and a cracking cylinder into which crude oil is inducted through a spray nozzle.

The object of my invention consists in providing a novel type of furnace of the character designated, whereby heat of any desired propensity may envelope and encircle the cracking cylinder giving an even heat to all of its parts.

Another object of my invention consists in the regulation and control of the heat in its application to the cracking cylinder.

Another object of my invention consists in providing a removable floor in heating chamber of furnace for economical convenience in inspecting, cleaning out and repairing inside of heating chamber and outside of cracking cylinder.

A further object of my invention consists in providing a means for removing cracking cylinder from heating chamber without dismantling furnace or heating chamber.

Another object of my invention consists in the induction of crude oil, as spray, to the inside surfaces of the heated cracking cylinder.

A still further object of my invention consists in providing a means for entrance into cracking cylinder for purpose of inspecting and cleaning the inside thereof.

The foregoing objects are, to the best of my knowledge and belief, new and distinct inventions; they combine herein however and mutually contribute in perfecting and making my furnace and cracking unit the most economical and highly efficient of its kind.

Various other objects and advantages will be more fully apparent from the following description of the accompanying drawings, which form a part of this disclosure, and which illustrate a preferred form of embodiment of the invention.

Of the drawings

Fig. 4 is a plan view of furnace complete.

Fig. 5 is a cross section through furnace, circular flue, dampers, damper frames and cracking cylinder, on line 42—42 in Fig. 1.

Fig. 6 is a cross section of damper and frame on line 43—43 in Fig. 5.

Various types of furnaces and processes have previously been designed for extracting gasoline from crude petroleum oil, but they, without exception contain no proper or successful means of controlling or regulating the heat in its application to the cracking cylinder. This results in excessive heat of a portion of the cylinder and not sufficient heat of other parts thereof, and this, in turn, results in economic loss in that the cylinder is so damaged as to require constant repair or replacement, and in operation the substance treated must be run numerous times. Furthermore, as pressure is always necessary in the application of the substance treated, the pressure necessary to one area of such unequally heated cylinder for the proper vaporization of the substance treated is excessive in another portion of such cylinder, and this excessive heat and pressure is always dangerous to the operator and plant. And further, in order to examine or inspect the inside of furnace or outside of cracking cylinder, or to remove cracking cylinder from the present day cracking plants, it is necessary to tear down furnace or some material portion of it, resulting in expensive delays in operating.

Figure 3:
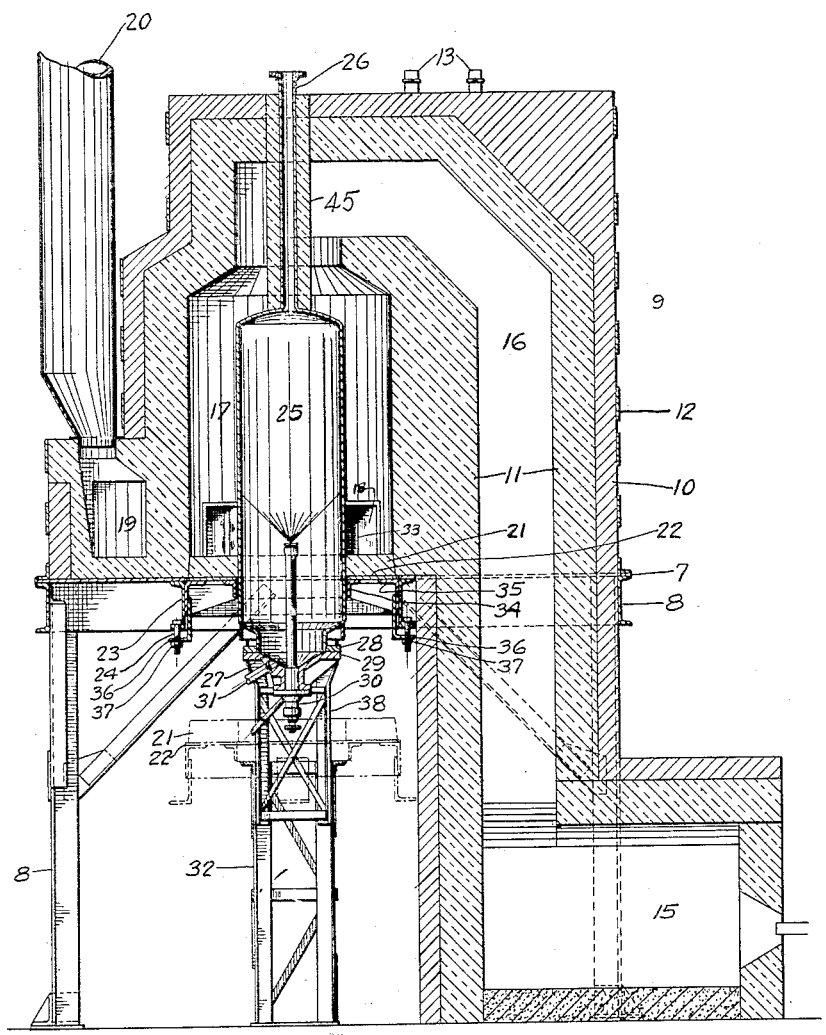
Fig. 3 is a vertical section through furnace, floor, furnace support, cracking cylinder, cracking cylinder support, combustion chamber, heating chamber, flues and stack, on line 41—41 in Fig. 4.

By my invention I have eliminated the foregoing objections by providing means which are adapted to produce and equally distribute and apply heat of the temperature desired to a cracking cylinder thereby so heating it as to most successfully extract from the oil applied to the inside of cylinder by spray nozzle, as illustrated in Fig. 3, and vaporize the maximum gasoline content thereof without either excessive heat or excessive pressure. Also, in my furnace, the cracking cylinder may be entirely removed without molesting furnace and complete inspection of the inside of heating chamber and outside of cracking cylinder may be quickly and conveniently made through the removable floor of furnace.

As illustrated in the drawings, my invention comprises a supporting member 7, furnace 9, heat controls 33 sliding in frame 40 and removable floor 21—22; a removable cracking cylinder 25 with removable head 29, and means for effecting removal of floor of heating chamber and the cracking cylinder without dismantling or molesting furnace.

Figures 1, 2:
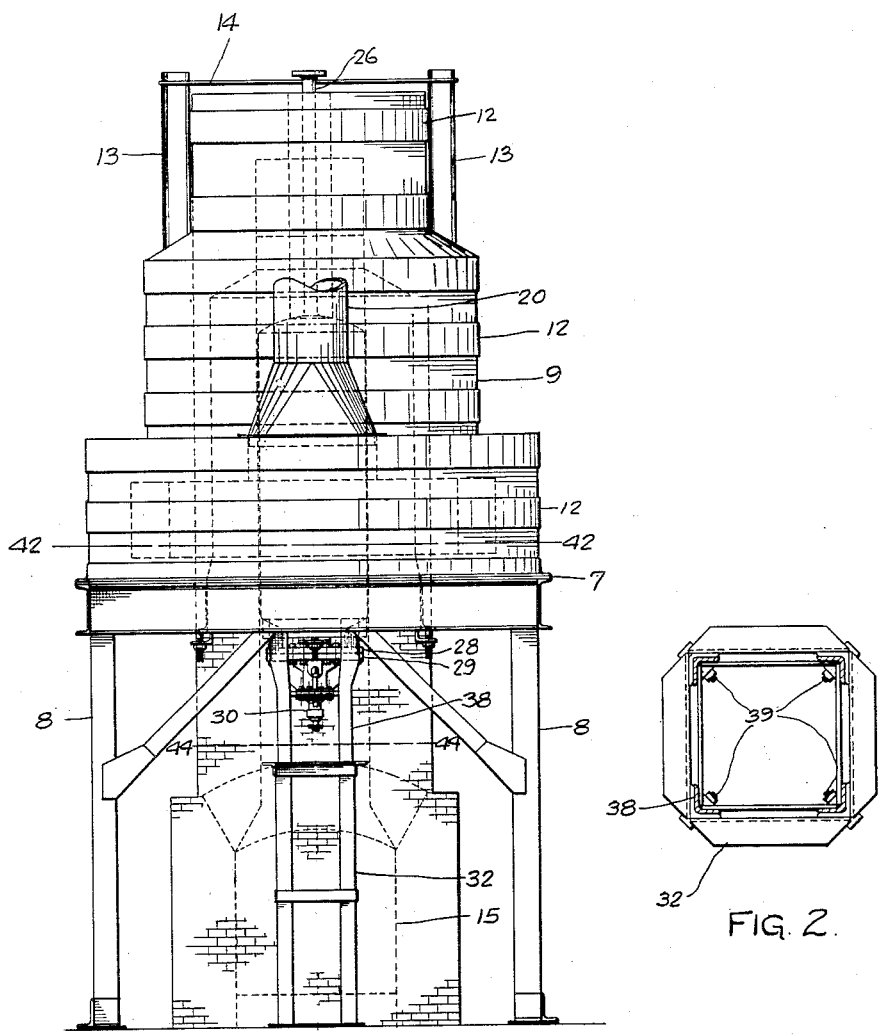
Fig. 1 is a full front elevation view of furnace complete.
Fig. 2 is a cross section through cracking cylinder support, line 44—44 in Fig. 1.

Heating chamber of furnace 9 is mounted upon support structure 7—8 at sufficient height to render convenient the lowering of heating chamber floor and removing cracking cylinder. (See Figs. 1, 3 and 4).

The furnace 9, illustrated in Figs. 1, 3, 4 and 5, may be constructed of any suitable material, but preferably of red brick 10, lined with fire brick 11, and supported with flat steel bands 12, around circumference of furnace which are held in place by vertical supports 13, and tie-rods 14. Furnace is constructed with a fire box 15 on ground level, flue 16, leading from fire box 15 to top of heating chamber 17; heating chamber 17 is a vertical shaft; at bottom of heating chamber 17 are outlets 18 (see Figs. 3, 5 and 6) connecting heating chamber 17 to a circular flue 19, around lower portion of heating chamber 17 (see Fig. 5) which circular flue connects with stack 20.

The fire brick floor 21 of heating chamber 17 (Fig. 3) is supported by steel plate 22 fitted in framing 23 of member 7, and held in place by bolts 24.

The cracking cylinder 25, (Figs. 3 and 5), is a steel cylinder which passes through heating chamber floor 21—22, and extends vertically into heating chamber 17; this cylinder is of one piece construction with one center outlet 26 in top for connection with cooling system and an opening 27 in bottom to admit of inspection and repair.

Outlet pipe 26 is insulated with fire brick 45 which insulated pipe is larger than metal flange of pipe 26, thus enabling the whole pipe as insulated to pass through the top of furnace 9.

A flange 28 is screwed and welded on cracking cylinder 25 (see Fig. 3); a reducing cap 29 is attached to flange 28; through cap 29 spray nozzle 30, placed in a vertical position extends into cracking cylinder 25; a drain pipe 31 leads from cap 29; an automatic float valve attached to drain pipe 31, automatically controls the draining of refuse.

Cylinder 25, cap 29 and nozzle 30 are supported by a steel frame 32, (see Figs. 1, 2 and 3) which is independent of furnace and furnace supports.

The cracking cylinder support 32 is arranged so that cracking cylinder 25 may be removed and replaced without disturbing furnace structure 9. By removing bolts 39 in support 32 and lower part of support 38, support 38 will slide inside of support 32; supports 32 and 38 can then be removed from foundation leaving space clear for lowering and removing cracking cylinder 25 from furnace 9.

Heating chamber floor 21 illustrated in Fig. 3, is composed of same material as furnace and supported by circular steel plate 22; this plate 22 is attached to two circular angles 34 and 35, inner angle 34 being slightly larger in diameter than cracking cylinder 25, so as to easily slide over same, while outer angle 35 is smaller in diameter than the framing 23, thus permitting it to slide into square framing 23. A small clip angle 36, is welded to angle 35, toeing out, so that the bolts 24 can pass through the toe of framing channel 23, and on through the toe of clip angle 36, thereby holding the heating chamber floor 21—22 in place. To remove floor 21—22, remove nuts 37 from bolts 24; this permits floor 21—22 to slide downward over the cracking cylinder 25, also the upper part of cracking cylinder support 38, and coming to rest on top of supports 32, as illustrated in Fig. 3. When thus lowered floor 21—22, makes convenient working floor or platform for use in inspecting and repairing interior of heating chamber 17 and exterior of cracking cylinder 25.

In my furnace the heat generated through any desired method, in combustion chamber 15, (see Figs. 3 and 4), travels through flue 16 to heating chamber 17, entering heating chamber shaft from the top thereof and by downward draft passes down around and completely envelopes the cracking portion of cracking cylinder 25, (see Fig. 3). The flow of this heat I control by outlets 18 and dampers 33 (see Figs. 3, 5 and 6) and am thus enabled to supply a steady, even heat, of any required degree, to all the upper portion of the cracking cylinder and with this evenly controlled heat I produce the maximum amount of vaporization as the oil is sprayed into the cracking cylinder (see Fig. 3). The degree of heat is ascertained by heat gauges advantageously placed, but these are no part of my invention. The heat gases, after leaving dampered outlets, pass out through circular flue 19 to and through stack 20.

In operation, the oil sprayed through the spray nozzle 30 into cracking cylinder 25 is applied equally, under the same degree of pressure, to all the upper or top most area of the wall surface of the inside of the cracking cylinder, and as that portion of the cracking cylinder 25 extending into heating chamber 17 is, under my furnace plan and system of heat control, heated to the proper temperature therefor evenly and uniformly throughout, vaporization takes place immediately from all sides alike, and the vapor passes through the top center outlet pipe 26 to cooling rack. Furthermore, the greater portion of that part of the oil spray which has not already become vaporized will vaporize before reaching the bottom of cylinder.

Although I have illustrated but one form of my invention and have described in detail but a single application thereof, it will be apparent to those skilled in the art that my invention is not so limited, but that various minor modifications and changes may be made therein without departing from the spirit of my invention or from the scope of the appended claims, I particularly include the use of this furnace in extracting oils, gases and commercial gases from oil shale, and in all other uses wherein the control and regulation of furnace heat is essential, and also in all cases wherein the economic operation, including the accessibility for inspection, repair and/or removal of inside parts, of furnaces is required or desired.

I claim:

1. A furnace, comprising a vertical heating chamber, a floor in the heating chamber which is removable from the heating chamber by sliding downward, a fire box, a flue leading from the fire box upwardly, over and downwardly and connecting with the top of the vertical heating chamber, a stack, an eccentric flue encircling the lower portion of the heating chamber and connecting with the stack, multiple outlets connecting the lower portion of the heating chamber with the eccentric flue, and a sliding damper in each of the outlets.

2. The combination in an oil cracking plant furnace of a vertical heating chamber, a fire box, a flue leading from the fire box upward, over and downward into the vertical heating chamber, a removable floor in the heating chamber, a metal cracking cylinder extending through the removable floor vertically into the heating chamber, a stack, an eccentric flue encircling the lower portion of the heating chamber and connecting with the stack, multiple outlets connecting the heating chamber with the eccentric flue, and a sliding damper in each outlet.

3. A furnace combination comprising a vertical heating chamber mounted upon a skeleton support structure, a floor in the heating chamber which is removable by sliding downward from the heating chamber, a metal oil cracking cylinder extending through the floor of the heating chamber and held in place by a separate metal skeleton support structure, which cylinder is removable by sliding downward through the furnace skeleton support structure, a fire box on the ground floor surface upon which the furnace support structure stands, a flue leading from the fire box upwardly, over and downwardly into the top of the vertical heating chamber, a stack, an eccentric flue encircling the lower portion of the heating chamber and connecting with the stack, multiple outlets connecting the heating chamber with the eccentric flue and a damper in each outlet.

4. The combination in an oil cracking plant unit of a vertical heating chamber, a removable floor in the heating chamber, a removable metal cracking cylinder which when in place extends through the floor vertically into the heating chamber, a spray nozzle extended vertically into the cracking cylinder, a fire box, a flue extending from the fire box upwardly, over and downwardly to and connecting with the top of the heating chamber, a stack, an eccentric flue encircling the lower portion of the heating chamber and connecting with the stack, multiple outlets connecting the lower portion of the heating chamber with the eccentric flue, and a sliding damper in each outlet.

5. The combination, comprising a furnace or cracking plant unit for producing gasoline and commercial gases from oil through a cracking process, comprising a vertical heating chamber, a removable floor in the heating chamber, a removable metal cracking cylinder extending through the removable floor vertically into the vertical heating chamber, a spray nozzle extending vertically into the metal cracking cylinder, a vapor outlet pipe extending from the metal cracking cylinder through the top of the vertical heating chamber, a fire box, a flue leading from the fire box upwardly, over and downwardly into the top of the vertical heating chamber, a stack, an eccentric flue encircling the lower portion of the heating chamber and connecting with the stack, multiple ports connecting the heating chamber with the eccentric flue, and a sliding damper in each port.

6. A furnace combination, comprising a vertical heating chamber mounted upon a metal skeleton support structure, a removable metal oil cracking cylinder extending through the floor of the heating chamber vertically into the heating chamber and held in place by a separate metal skeleton support structure, an adjustable cracking cylinder support permitting the cylinder to be removed by sliding downward out of the heating chamber through the furnace support structure, a floor in the heating chamber which is held in place by adjustable supports and is removable by sliding downward through the furnace skeleton support structure and over the cracking cylinder support structure, a fire box on the ground floor surface upon which the metal furnace support structure rests, a flue leading from the fire box upward, over and downward into the top of the vertical heating chamber, a stack, an eccentric flue encircling the lower portion of the heating chamber and connecting with the stack, multiple outlets connecting the heating chamber with the eccentric flue and a damper in each outlet.

Signed at Los Angeles, California, this 6th day of March, 1929.

GROVER C. MILLER.